US008213394B2

(12) United States Patent
Coulas et al.

(10) Patent No.: US 8,213,394 B2
(45) Date of Patent: Jul. 3, 2012

(54) METHOD AND APPARATUS FOR MANAGEMENT OF INACTIVE CONNECTIONS FOR SERVICE CONTINUITY IN AN AGNOSTIC ACCESS INTERNET PROTOCOL MULTIMEDIA COMMUNICATION

(75) Inventors: Michael F. Coulas, Buffalo Grove, IL (US); Robert Horvath, Arlington Heights, IL (US); Bradley F. Jentz, Barrington, IL (US)

(73) Assignee: Motorola Mobility, Inc., Libertyville, IL (US)

( * ) Notice: Subject to any disclaimer, the term of this patent is extended or adjusted under 35 U.S.C. 154(b) by 598 days.

(21) Appl. No.: 11/581,644

(22) Filed: Oct. 16, 2006

(65) Prior Publication Data

US 2008/0089290 A1 Apr. 17, 2008

(51) Int. Cl.
*H04Q 7/24* (2006.01)
(52) U.S. Cl. ..... 370/338; 370/331; 370/328; 455/426.2; 709/227
(58) Field of Classification Search .................. 370/338, 370/331, 328, 216; 455/436, 426.2; 709/227, 709/240
See application file for complete search history.

(56) References Cited

U.S. PATENT DOCUMENTS

| 6,707,809 | B1 * | 3/2004 | Warrier et al. ................ 370/351 |
| 6,766,373 | B1 * | 7/2004 | Beadle et al. ................ 709/227 |
| 6,917,587 | B1 * | 7/2005 | Sarkar et al. .................. 370/230 |
| 7,436,779 | B1 * | 10/2008 | Mangal et al. ................ 370/252 |
| 7,616,624 | B2 * | 11/2009 | John et al. ..................... 370/352 |
| 2002/0034298 | A1 | 3/2002 | Gallagher et al. |
| 2002/0045458 | A1 * | 4/2002 | Parantainen et al. ......... 455/466 |
| 2002/0194331 | A1 * | 12/2002 | Lewis et al. ................... 709/224 |
| 2003/0223426 | A1 | 12/2003 | Requena et al. |
| 2004/0044771 | A1 * | 3/2004 | Allred et al. .................. 709/227 |
| 2004/0109459 | A1 * | 6/2004 | Madour et al. ................ 370/401 |
| 2004/0116120 | A1 * | 6/2004 | Gallagher et al. ............ 455/436 |

(Continued)

FOREIGN PATENT DOCUMENTS

AU 2005270966 A1 2/2006

(Continued)

OTHER PUBLICATIONS

"IP multimedia call control protocol based on SIP and SDP," 3rd. Gen. Partnership Proj. (3GPP); Tech. Spec. Group Core Network and Terminals; Stage 3 (Rel. 7), 3GPP TS 25.229 v7.4.0, pp. 72-87 (Jun. 2006).

(Continued)

*Primary Examiner* — Rafael Pérez-Gutiérrez
*Assistant Examiner* — Joseph Arévalo
(74) *Attorney, Agent, or Firm* — Faegre Baker Daniels LLP

(57) ABSTRACT

State machine diagram (300) illustrates inactive connection (303) management wherein all bindings are deregistered, but active sessions remain. The mobile station may, re-register the connection (309), to stop the Linger Timer (305) and return the connection to the active state (303) before timeout, or otherwise before the inactive connection is terminated. Otherwise, the Linger Timer may be stopped when the last active session is moved to a different connection, or released (311). If the Linger Timer times out (315), any active sessions will be released without the explicit action of the mobile station. In the active state (303), if all bindings are deregistered and no active sessions are present, the connection may be terminated immediately as in (313), without invoking the Linger Timer. Thus, the mobile station has an opportunity to take action regarding remaining sessions, such as releasing or refreshing on a different but active connection.

5 Claims, 12 Drawing Sheets

U.S. PATENT DOCUMENTS

| | | | |
|---|---|---|---|
| 2004/0166898 A1 | 8/2004 | Tajima | |
| 2004/0176091 A1 | 9/2004 | Bajko et al. | |
| 2004/0185848 A1* | 9/2004 | Phan-Anh et al. | 455/435.1 |
| 2004/0210671 A1 | 10/2004 | Beadle et al. | |
| 2004/0264410 A1 | 12/2004 | Sagi et al. | |
| 2005/0009515 A1* | 1/2005 | Inoko | 455/426.2 |
| 2005/0065801 A1* | 3/2005 | Poikselka et al. | 705/1 |
| 2005/0078642 A1* | 4/2005 | Mayer et al. | 370/338 |
| 2005/0094601 A1* | 5/2005 | Hsu et al. | 370/331 |
| 2005/0111377 A1 | 5/2005 | Lioy et al. | |
| 2005/0120198 A1 | 6/2005 | Bajko et al. | |
| 2005/0141455 A1 | 6/2005 | Kim et al. | |
| 2006/0030320 A1 | 2/2006 | Tammi et al. | |
| 2006/0062207 A1 | 3/2006 | Julka et al. | |
| 2006/0072542 A1 | 4/2006 | Sinnreich et al. | |
| 2006/0104228 A1* | 5/2006 | Zhou et al. | 370/328 |
| 2006/0140151 A1* | 6/2006 | Dantu et al. | 370/331 |
| 2007/0081518 A1* | 4/2007 | Jain et al. | 370/352 |
| 2007/0121673 A1 | 5/2007 | Hammer | |
| 2007/0178904 A1 | 8/2007 | Oyama | |
| 2007/0217366 A1 | 9/2007 | Sagi et al. | |
| 2007/0280154 A1* | 12/2007 | Gupta et al. | 370/328 |
| 2007/0298835 A1 | 12/2007 | Uehara et al. | |
| 2008/0075048 A1* | 3/2008 | Suszko | 370/338 |
| 2008/0084869 A1 | 4/2008 | Hearty et al. | |

FOREIGN PATENT DOCUMENTS

| | | |
|---|---|---|
| AU | 2002314473 B2 | 2/2008 |
| BR | 0209509 A | 7/2004 |
| CA | 2447049 A1 | 11/2002 |
| CA | 2529556 A1 | 1/2005 |
| CA | 2576020 A1 | 2/2006 |
| CN | 1531833 A | 9/2004 |
| CN | 101023700 A | 8/2007 |
| EP | 1199843 A2 | 4/2002 |
| EP | 1386515 A1 | 2/2004 |
| EP | 1673676 A2 | 6/2006 |
| EP | 1678835 A2 | 7/2006 |
| EP | 1782654 A1 | 5/2007 |
| EP | 1827034 A1 | 8/2007 |
| GB | 2366948 A | 3/2002 |
| JP | 2004533165 T | 10/2004 |
| JP | 2007527644 T | 9/2007 |
| JP | 2008509586 T | 3/2008 |
| KR | 20060025206 A | 3/2006 |
| KR | 20070041771 A | 4/2007 |
| MX | PA03010256 A | 3/2004 |
| RU | 2287911 C2 | 11/2006 |
| WO | 02091785 A | 11/2002 |
| WO | 02091785 A1 | 11/2002 |
| WO | 02091786 A | 11/2002 |
| WO | 02091786 A1 | 11/2002 |
| WO | 2004057445 A2 | 7/2004 |
| WO | 2005006570 A2 | 1/2005 |
| WO | 2005036299 A2 | 4/2005 |
| WO | 2006016236 A1 | 2/2006 |
| ZA | 200308695 A | 7/2004 |

OTHER PUBLICATIONS

Rosenberg, "Obtaining and Using Globally Routable User Agent (UA) URIs (GRUU) in the Session Initiation Protocol," IETF Internet-Draft; draft-ietf-sip-gruu-10 (Jul. 31, 2006).

Ericsson, "Solution for session continuity using multiple simultaneous registrations," 3GPP TSG SA WG2 Architecture, S2-062213 (Jun. 2006).

Roach, A.B. "RFC3265: Session Initiation Protocol (SIP)—Specific Event Notification." The ACM Portal. Internet Society. Mar. 30, 2009 <http://delivery.acm.org/10.1145/rfc_fulltext/RFC3265/rfc3265. txt . . . y2=1438718321&coll=GUIDE&dl=GUIDE &CFID=28565659&CFTOKEN=35909071>.

Hoffman, Bill, Monitoring at your Service., ACM Queue., Dec. 2005.

"Numbering, addressing and identification," 3rd Gen. Parnership Proj. (3GPP); Tech. Spec. Group Core Network and Terminals; Release 8, 3GPP TS 23.003 v8.4.0 pp. 1-6, 35-38, and 56-59 (Mar. 2009).

International Search Report for PCT Application No. PCT/US2007/078693, Aug. 21, 2008.

International Search Report for PCT Application No. PCT/US2007/078697, Aug. 14, 2008.

United States Patent and Trademark Office, "Non-Final Rejection" for U.S. Appl. No. 13/397,246 dated Mar. 26, 2012, 19 pages.

* cited by examiner

*1400*

```
REGISTER SIP: registrar.home1 .net SIP/2.0
Via: SIP/2.0/UDP 192.0.2.3:1357;branch=z9hG4bKnashds7
Max-Forwards: 70
P-Access-Network-Info: IEEE-802.11g; mac-address: 124343abcd3f
From: <sip:user1_public1@home1.net>; tag=4fa3
```
*1401* — To: <sip:user1_public1@home1.net>; imsglobreg
*1407* — Contact: <sip: {new contact address IP};transport=udp>;
+sip.instance="<urn:<NID>:<NSS>>";expires=600000
```
Call-ID: apb03a0s09dkjdfglkj49111
Authorization: Digest username="user1_private@home1.net",
realm="registrar.home1.net", nonce="",uri="sip:registrar.home1.net", response=""
Security-Client: ipsec-3gpp; alg=hmac-sha-1-96; spi-c=78901234; spi-s=01234567;
port-c=3562; port-s=1357
```
*1403* — Require: sec-agree, seamless-ims
*1405* — Proxy-Require: sec-agree, seamless-ims
```
CSeq: 5 REGISTER
Supported: path, gruu
Content-Length: 0
```

```
SIP/2.0 401 Unauthorized
Via: SIP/2.0/UDP 192.0.2.3:7531 ;branch=z9hG4bKnashds7
From: <sip:user1_public1@home1.net>; tag=4fa3
```
*1501* — To: <sip:user1_public1@home1.net>; tag=5ef4; imsglobreg
```
Call-ID: apb03a0s09dkjdfglkj49111
WWW-Authenticate: Digest realm="registrar.home1.net",
nonce=base64(RAND+AUTN+server specific data), algorithm=AKAv1-MD5
Security-Server: ipsec-3gpp; q=0.1; alg=hmac-sha-1-96; spi-c=43210980;
spi-s=23456789; port-c=3562; port-s=5463
CSeq: 5 REGISTER
Content-Length: 0
```

*FIG. 15*

```
1600
┌─────────────────────────────────────────────────────────────────┐
│ REGISTER SIP: registrar. home1 .net SIP/2.0                     │
│ Via: SIP/2.0/UDP 192.0.2.3:1357;branch=z9hG4bKnashds7           │
│ Max-Forwards: 70                                                │
│ P-Access-Network-Info: IEEE-802.11g; mac-address: 124343abcd3f  │
│ From: <sip:user1_public1@home1.net>; tag=4fa3                   │
│ To: <sip:user1_public1@home1.net>; imsglobreg                   │  ← 1601
│ Contact: <sip: 192.0.2.3:1357;transport=udp>;                   │
│ +sip.instance="<urn:<NID>:<NSS>>";expires=600000 Call-ID:       │
│ apb03a0s09dkjdfglkj49111                                        │
│ Authorization: Digest username="user1_private@home1.net",       │
│ realm="registrar.home1.net", nonce=base64(RAND + AUTN + server specific data), │
│ algorithm=AKAv1-MD5,uri="sip:registrar.home1.net",              │
│ response="9629ffe49693a05327480975h07d4ef1"                     │
│ Security-Client: ipsec-3gpp; alg=hmac-sha1-96; spi-c=78901234; spi-s=01234567; │
│ port-c=3562; port-s=1357                                        │
│ Security-Verify: ipsec-3gpp; q=0.1; alg=hmac-sha-1-96; spi-c=43210980; │
│ spi-s=23456789; port-c=3562; port-s=5463                        │
│ Require: sec-agree, seamless-ims                                │  ← 1603
│ Proxy-Require: sec-agree, seamless-ims                          │  ← 1605
│ CSeq: 5 REGISTER                                                │
│ Supported: path, gruu                                           │
│ Content-Length: 0                                               │
└─────────────────────────────────────────────────────────────────┘
```

FIG. 16

```
1700
┌─────────────────────────────────────────────────────────────────┐
│ SIP/2.0 200 Ok                                                  │
│ Via: SIP/2.0/UDP 192.0.2.3:7531 ;branch=z9hG4bKnashds7          │
│ From: <sip:user1_public1@home1.net>; tag=4fa3                   │
│ To: <sip:user1_public1@home1.net>; tag=5ef4;                    │
│ Call-ID: apb03a0s09dkjdfglkj49111                               │
│ Contact: <sip: 192.0.2.3:1357; transport=udp>;                  │  ← 1701
│ +sip.instance="<urn:<NID>:<NSS>>";                              │
│ gruu="sip:imsgruu-0000000001@home1.net"; expires=600000         │
│ Path: <sip:term@pcscf1. visited1.net;lr>                        │
│ Service-Route: <sip:orig@scscf1. home1.net;lr>                  │
│ P-Associated-URI: <sip:user2_public2@home1.net>,                │
│ <sip:+1-212-555-1111@home1.net;user=phone>                      │
│ CSeq: 3 REGISTER                                                │
│ Content-Length: 0                                               │
└─────────────────────────────────────────────────────────────────┘
```

FIG. 17

```
NOTIFY sip:192.0.2.3:7531 ;grid=1234 SIP/2.0
Via: SIP/2.0/UDP pcscf1.visited1.net:7531;branch=z9hG4bK240f34.1,
SIP/2.0/UDP scscf1.home1.net;branch=z9hG4bK332b23.1
Max-Forwards: 69
From:<sip:user1_public1@home1.net>;tag=151170
To: <sip:user1_public1@home1.net>;tag=31415
Call-ID: b89rjhnedlrfjflslj40a222
CSeq: 42 NOTIFY
Subscription-State: active;expires=36000
Event:reg
Content-Type: application/reginfo+xml
Contact:<sip:scscf1.home1.net>
Content-Length (---)
<?xml version="1.0"?>
<reginfo xmlns="urn:ietf:params:xml:ns:reginfo"
        version="1" state="full">
   <registration aor="sip:user1_public1@home1.net" id="a7" state="active">
      <contact id="76" state="active" event="refreshed">
                 <instanceID>urn:<NID>:<NSS></instanceid>
                 <gruu>sip:imsgruu-0000000001@home1.net</gruu>
         <uri>sip;192.0.2.3</uri>
      </contact>
   </registration>
   </registration aor="tel:+1-212-555-1111" id="a9" state="active">
      <contact id="78" state="active" event="refreshed">
         <instanceID>urn:<NID>:<NSS></instanceid>
                 <gruu>sip:imsgruu-0000000003@home1.net</gruu>
         <uri>sip;192.0.2.3</uri>
      </contact>
   </registration>
   </registration aor="sip:user2_public2@home1.net" id="a8" state="active">
      <contact id="77" state="active" event="refreshed">
         <uri>sip;192.0.2.3</uri>
      </contact>
   </registration>
   </registration aor="sip:user3_public3@home1.net" id="aa" state="active">
      <contact id="79" state="active" event="refreshed">
                 <instanceID>urn:<NID>:<NSS></instanceid>
                 <gruu>sip:imsgruu-0000000004@home1.net</gruu>
         <uri>sip;192.0.2.3</uri>
      </contact>
   </registration>
   </registration aor="tel:+1-212-555-3333" id="ab" state="refreshed">
      <contact id="80" state="active" event="created">
         <instanceID>urn:<NID>:<NSS></instanceid>
                 <gruu>sip:imsgruu-0000000005@home1.net</gruu>
         <uri>sip;192.0.2.3</uri>
      </contact>
   </registration>
</reginfo>
```

METHOD AND APPARATUS FOR MANAGEMENT OF INACTIVE CONNECTIONS FOR SERVICE CONTINUITY IN AN AGNOSTIC ACCESS INTERNET PROTOCOL MULTIMEDIA COMMUNICATION

CROSS-REFERENCE TO RELATED APPLICATIONS

The present disclosure is related to copending U.S. patent application Ser. No. 11/581,627, "METHOD AND APPARATUS FOR SEAMLESS CONNECTIONS AND SERVICE CONTINUITY IN AN AGNOSTIC ACCESS INTERNET PROTOCOL MULTIMEDIA COMMUNICATION SYSTEM," and copending U.S. patent application Ser. No. 11/581,628, "METHOD AND APPARATUS FOR RE-REGISTRATION OF CONNECTIONS FOR SERVICE CONTINUITY IN AN AGNOSTIC ACCESS INTERNET PROTOCOL MULTIMEDIA COMMUNICATION SYSTEM," both of which are assigned to the same assignee as the present application, and both of which are hereby incorporated by reference herein.

FIELD OF THE DISCLOSURE

The present disclosure relates generally to wireless communications systems, and more particularly to agnostic access Internet Protocol multimedia communications systems and services, and to mobility of terminals accessing such systems and services.

BACKGROUND

The $3^{rd}$ Generation Partnership Project, 3GPP specifications have introduced agnostic Internet Protocol (IP) Multimedia Service (IMS) access via an IP Connectivity Access Network (IP-CAN) wherein an IMS enabled terminal may access 3GPP IMS services using various IP-CANs such as, but not limited to, GPRS/UMTS, 3GPP-IWLAN, WLAN direct IP access, etc., and using a variety of radio access technologies such as, but not limited to, UTRAN, GERAN, 802.11, Bluetooth, etc.

In such agnostic IMS access networks, an IMS terminal may obtain an IP address that is routable in the 3GPP PLMN that it's accessing, perform an initial IMS registration/authentication procedure using that address, and the terminal is ready for communication. The IMS network itself does not care whether the address was obtained via a PDP context activation or as a result of IPsec tunnel establishment with a Packet Data Gateway (PDG) or any other IP-CAN specific connection mechanism.

The advent of IP-CAN agnostic IMS access raises the possibility of IMS mobility across heterogeneous IP-CANs and consequently issues relating to IMS service continuity across IP-CANs. One such issue is that changing IP-CANs usually always entails a change in local IP address and, unfortunately, changing IP address while connected to an IMS network is extremely disruptive.

For example, changing the local IP address in the IMS Terminal may result in the following undesirable actions with respect to IMS connectivity and services: loss of all on-going IMS dialogs (i.e., sessions and subscriptions) and transactions; deregistration of all explicitly and implicitly registered public user identities; user re-authentication with IMS core and a establishment of a new set of IPsec Security Associations (SAs) between the IMS Terminal and the network; re-registration of all previously registered public user identities registered with the IMS core using the new IP address; and user re-subscription to the registration event package.

In other words, the current IMS connectivity and services are lost and need to be re-established from scratch. As a result, seamless "make before break" and "break before make" IMS handoff scenarios to a new IP address cannot be supported using the current IMS functionality.

Some suggested solutions for achieving service continuity in IMS networks revolve around the use of Mobile IP to support mobility at the IP layer between various IP-CANs. However, Mobile IP supports mobility for scenarios in which a mobile terminal needs to move between different network domains, but does not require a corresponding change to the SIP proxy. In order to change proxies, the mobile requires application (i.e. IMS) layer mobility and not network layer mobility as supported by Mobile IP.

An additional shortcoming of Mobile IP, with respect to IMS service continuity, is that Mobile IP only supports the movement of "all" the mobile's dialogs and sessions from one local IP connection to another. While this is desirable in many scenarios, there are other scenarios where the mobile may need to move only a specific subset of its dialogs and sessions from one local IP connection to another. In order to manage the mobility of specific dialogs and sessions, the mobile requires application (i.e. IMS) layer mobility and not network layer mobility as supported by Mobile IP.

Thus there is a need to extend an IMS network to allow an IMS terminal to establish new connections to the IMS network via different local IP connections and to move existing IMS registration bindings and sessions to those new IMS connections with minimal disruption to the user such that service continuity may be achieved.

BRIEF DESCRIPTION OF THE DRAWINGS

FIG. 14 is a detailed example of the initial SIP REGISTER message of the embodiment shown in FIG. 13.

FIG. 15 is a detailed example of the SIP 401 Unauthorized message of the embodiment shown in FIG. 13.

FIG. 16 is a detailed example of the second SIP REGISTER message of the embodiment shown in FIG. 13.

FIG. 17 is a detailed example of the SIP 200 OK message of the embodiment shown in FIG. 13.

FIG. 18 is a detailed example of the SIP NOTIFY message of the embodiment shown in FIG. 13.

DETAILED DESCRIPTION

Figure 1:
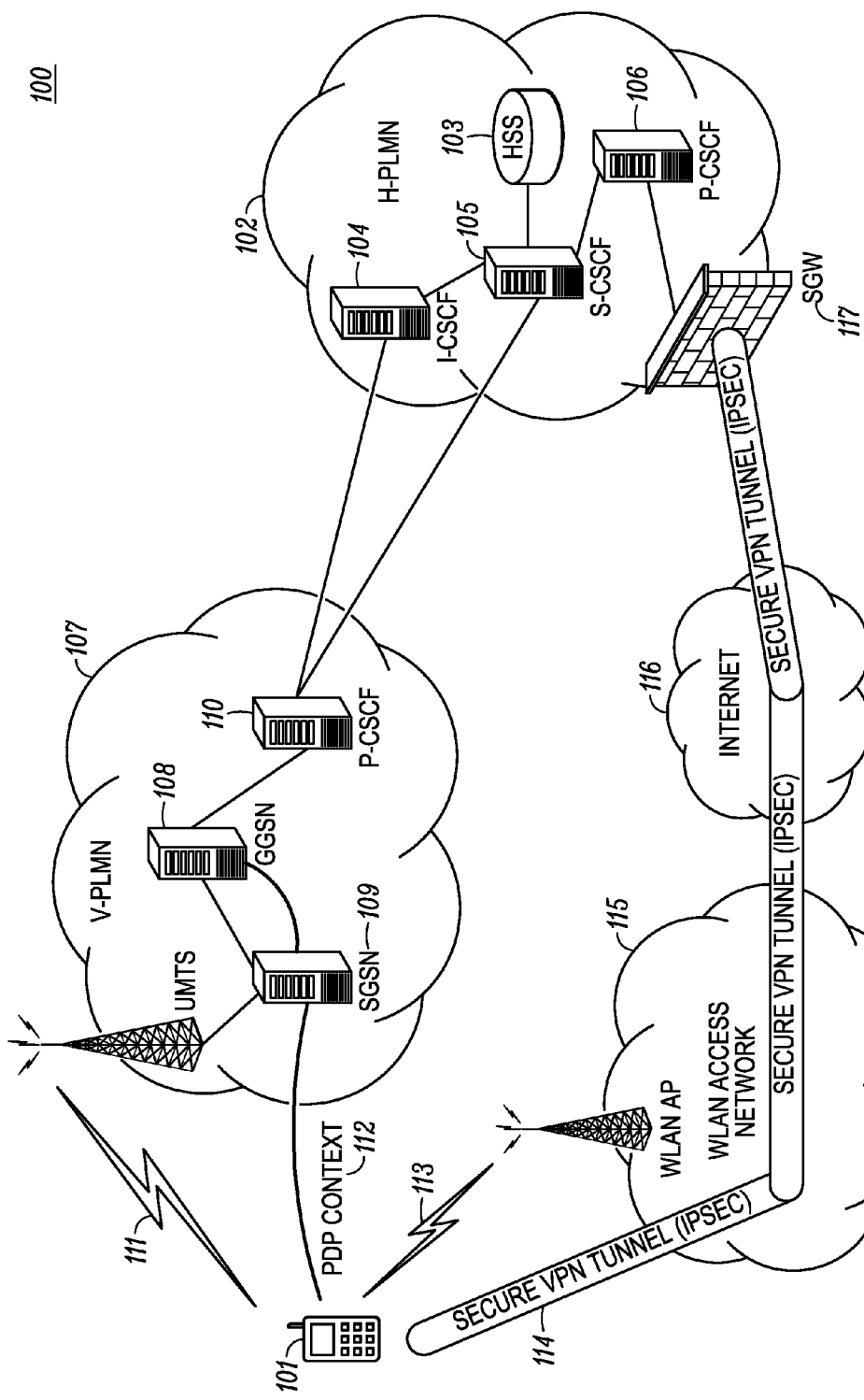
FIG. 1 is a block diagram of a wireless network having various Internet Protocol Connectivity Access Networks (IP-CANs) with various Proxy-Call Session Control Functions (P-CSCF) and providing agnostic Internet Protocol (IP) Multi-media Service (IMS) access to mobile stations.

Turning now to the drawings, FIG. 1 illustrates a network providing agnostic access Internet Protocol multimedia communication. Mobile station 101 may access the Internet 116 using any number of Radio Access Networks (RANs) such as Visitor Public Land Mobile Network (V-PLMN) 107 which may be, for example, a UMTS network or a GSM/GPRS network or any other radio access network providing a radio link 111, and/or via Wireless Local Area Network (WLAN) 115 which provides a different radio link 113. WLAN 115 may provide a radio interface 113 such as, but not limited to 802.11, 801.16, Bluetooth™, or other radio interface over which mobile station 101 may establish a secure virtual private network (VPN) tunnel using for example, IPsec connection 114, which connects through the Internet 116 and onto the mobile station 101 Home Public Land Mobile Network (H-PLMN) 102 through secure gateway (SGW) 117. For exemplary purposes, SGW 117 is shown located within H-PLMN 102 but may also be located within V-PLMN 107. It is to be understood that FIG. 1 is for exemplary purposes only and illustrates an exemplary network topology and that various other topologies may be utilized to provide agnostic access Internet Protocol multimedia communication.

Returning to FIG. 1, the V-PLMN 107 may provide a number of network components coupled to one or more base stations, such as a Serving GPRS Support Node (SGSN) 109 and Gateway GPRS Support Node (GGSN) 108, which enable mobile station 101 to establish a Packet Data Protocol (PDP) context with the V-PLMN 107.

A Proxy-Call Session Control Function (P-CSCF) 110 may also be present and coupled to for example, GGSN 108. The P-CSCF may manage Session Initiation Protocol (SIP) call sessions and may coordinate other network components, such as but not limited to the SGSN 109 and GGSN 108, for session control, feature and service control and resource allocation. The P-CSCF 110 provides a path to Internet Multimedia Service (IMS) for mobile station 101, the IMS being provided by H-PLMN 102 in the example illustrated by FIG. 1.

The P-CSCF 110 is further coupled to an Interrogating-CSCF (I-CSCF) 104 and a Serving-CSCF (S-CSCF) 105, coupled to a Home Subscriber Server 103, which in this example are all located within H-PLMN 102. Note that various distribution and location schemes may be employed for the P-CSCF 110, I-CSCF 104 and S—CSCF 105. The H-PLMN 102 may also comprise a P-CSCF 106 to enable connectivity, via SGW 117 with the Internet 116 and ultimately various radio access networks. The HSS 103 may provide subscriber databases and authentication and authorization.

The I-CSCF 104 provides a path into the mobile station 101 home network (H-PLMN 102) from various other networks such as V-PLMN 107. The I-CSCF 104 may perform a stateless SIP proxy function and may select the appropriate S-CSCF for a specific mobile station during SIP registration. SIP requests originating in other networks such as V-PLMN 107 and WLAN 115 may be routed to the S-CSCF 105 by the I-CSCF 104. For such SIP messaging, the I-CSCF 104 will generally query the HSS 103 for the appropriate S-CSCF address however, if the subscriber (mobile station 101) is not registered then the I-CSCF 104 may assign a S-CSCF, for example S-CSCF 105, to handle the SIP messages.

The S-CSCF 105 binds the mobile station 101 public user ID to a location, and may provide session control and handle SIP routing. The S-CSCF 105 may also interact with various application servers (not shown) to provide various sessions to mobile station 101.

The following terminology as used throughout herein, shall have applicable definitions as follows: an "IMS Connection" is an authenticated and secure communication path between a specific user equipment (UE) (which may also be referred to as an "IMS terminal," "mobile station," "wireless terminal," "IMS UE," "subscriber," etc. such as mobile station 101 in FIG. 1) contact address and its Serving—Call Session Control Function (S-CSCF), associated with a specific Private User ID, as specified in the 3GPP TS 24.229 standards and thus the definitions as understood by one of ordinary skill. Further, the IMS connection between the mobile station and the S-CSCF may be via a Proxy-CSCF (P-CSCF). In the various embodiments, a specific mobile station "contact address" is associated with an IMS Connection wherein different IMS Connections do not share the same contact address.

An "Active IMS Connection" is an IMS connection that currently has registration bindings. An "Inactive IMS Connection" is an IMS connection that no longer has registration bindings but does have active IMS sessions. A "Seamless IMS Connections procedure" is a procedure at the UE, Proxy-CSFC (P-CSCF) and S-CSCF that supports the seamless movement of registration bindings, dialogs and sessions among multiple IMS connections for a UE.

The various embodiments herein disclosed provide apparatuses and methods for maintaining IMS service continuity via Seamless IMS Connections implemented over different Internet Protocol (IP) connections.

In accordance with the various embodiments, a mobile station or "IMS terminal" and an "IMS network" enable one or more seamless IMS Connections to be associated with the same private user identity of a mobile station. Thus in the various embodiments, seamless IMS Connections have the following properties and support the following services as described in further detail below.

In the various embodiments, each IMS Connection may be securely connected to a specific P-CSCF via a set of IPsec Security Associations (SAs). However, also in accordance with the various embodiments, different IMS Connections may connect to different P-CSCFs or to the same P-CSCF, albeit via different IPsec SAs. Thus, in the various embodiments, each IMS Connection may support a different set of registration bindings and active SIP sessions and subscriptions.

IMS registration bindings may be moved across existing IMS Connections or to new IMS Connections, wherein new IMS Connections are established, with minimal disruption to associated SIP sessions and subscriptions. The Seamless IMS Connections model of the various embodiments supports unprotected and protected registration procedures for moving either all or specific registration bindings to an existing or new IMS Connection.

Further, the embodiments may, where appropriate, employ various standard SIP procedures and mechanisms to move active sessions and subscriptions to different IMS Connections. Therefore, further with respect to the various embodiments, two types of IMS Connections are defined and enabled. Specifically, an Active IMS Connection which has registration bindings and an Inactive IMS Connection which does not have registration bindings but does have Active IMS sessions.

In accordance with some embodiments, a Linger Timer is provided at the S-CSCF which maintains Inactive IMS Connection for a pre-determined period of time in order to allow a mobile station to move IMS sessions from an Inactive IMS Connection to an Active IMS Connection. Thus, Inactive IMS Connections are provided to support break before make handover scenarios, which may involve a mobile station changing its Radio Access Network (RAN) and/or P-CSCF, without the disruption to active sessions as could occur in prior systems as was discussed previously.

Figure 2:
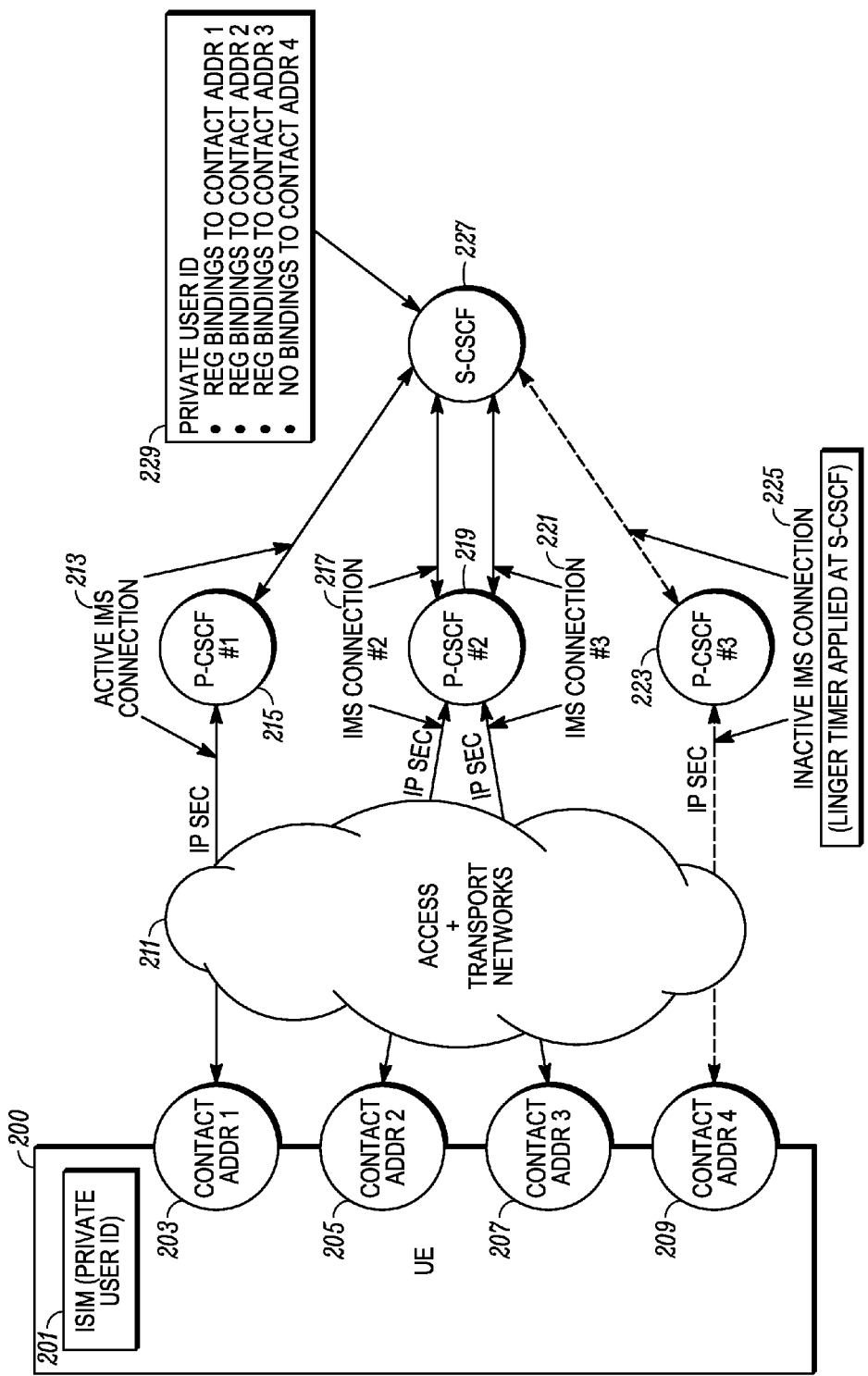
FIG. 2 is a block state diagram exemplifying multiple seamless IMS connections of a mobile station (User Equipment "UE") in accordance with various embodiments.

Turning now to FIG. 2, a state diagram providing an example of a multiple seamless IMS connection model in accordance with the various embodiments is illustrated. In FIG. 2, a User Equipment (UE) or mobile station 200 includes a Subscriber Identity Module (ISIM) 201 which provides a Private User ID. For the example illustrated by FIG. 2, a single ISIM 200 and thus a single Private User ID is assumed and therefore multiple IMS connection may be associated with the single Private User ID in accordance with the embodiments. However, some embodiments may include a UE having multiple ISIMs and thus multiple Private User IDs. Therefore, it is to be understood that, for such embodiments, a UE may have different sets of IMS Connections wherein a particular set of IMS Connections may be associated with a particular Private User ID while another set may be associated with a different Private User ID.

Returning to the example illustrated by FIG. 2, UE 200 may establish various IMS Connections via Access and Transport Networks 211 which may include the various access networks as illustrated in FIG. 1. Each IMS Connection is associated with a specific contact address. For example, active IMS Connection 213 is associated with contact address 1 203 and P-CSCF #1 215. Likewise IMS Connection #2 217 is associated with contact address 2 205 and P-CSCF #2 219.

Note that various IMS connections may be established through different or identical P-CSCFs and thus, a third IMS Connection 221 is associated with contact address 3 207 is also connected to P-CSCF #2 219. A fourth connection, inactive IMS connection 225 is connected to P-CSCF #3 223. All IMS connections between the UE 200 and any of the P-CSCFs shown in FIG. 2 are via IPsec connections. The various P-CSCFs complete the respective IMS connections to the S-CSCF 227 as shown.

Therefore, in accordance with the embodiments, at S-CSCF 227 the UE 200 is associated with one Private User ID 229 based upon the UE 200 ISIM 201. Further in accordance with the embodiments, contact addresses 1 203, 2 205, and 3 207 have associated registration bindings and thus new sessions may be established over any of IMS Connections 213, 217 or 221.

Inactive IMS connection 225 will still have associated active sessions, however, new sessions may not be established using IMS connection 225. An active IMS connection becomes inactive when the last registration binding associated with the connection is removed, that is, de-registered or re-registered elsewhere, however, the inactive IMS connection will still have active sessions as noted above. Such active sessions must be moved by the UE 200 or be lost. In accordance with some embodiments, a Linger Timer, which may be at the S-CSCF 227, will provide a time in which the UE 200 may move any pending active sessions associated with inactive IMS connection 225 to any of the other IMS connections, such as 213, 217 or 221. Thus, the inactive IMS connection 225 will not be terminated until either the Linger Timer time-out occurs, after which any active sessions, if not moved, would be lost, or when the last IMS session is either released or moved to another IMS connection, for example target refreshed or replaced.

If the IMS connection is terminated due to the Linger Timer time-out occurrence, then any IMS sessions that have not been moved or released by the UE 200 are released by the S-CSCF 227. The S-CSCF will maintain active IMS sessions over an inactive IMS connection even if the S-CSCF detects that IMS connectivity between the UE and the P-CSCF has been lost.

In the various embodiments, an inactive IMS connection may become active again if the UE 200 re-registers the same contact address that was previously registered, i.e., Address of Record (AOR) bindings, that is, Public User Identity bindings over the specific connection. However, the network or specifically in some embodiments the S-CSCF, may limit the number of active IMS connections associated with a Private User ID at any particular time to prevent possible abuse of the service or denial of service attacks.

Figure 3:
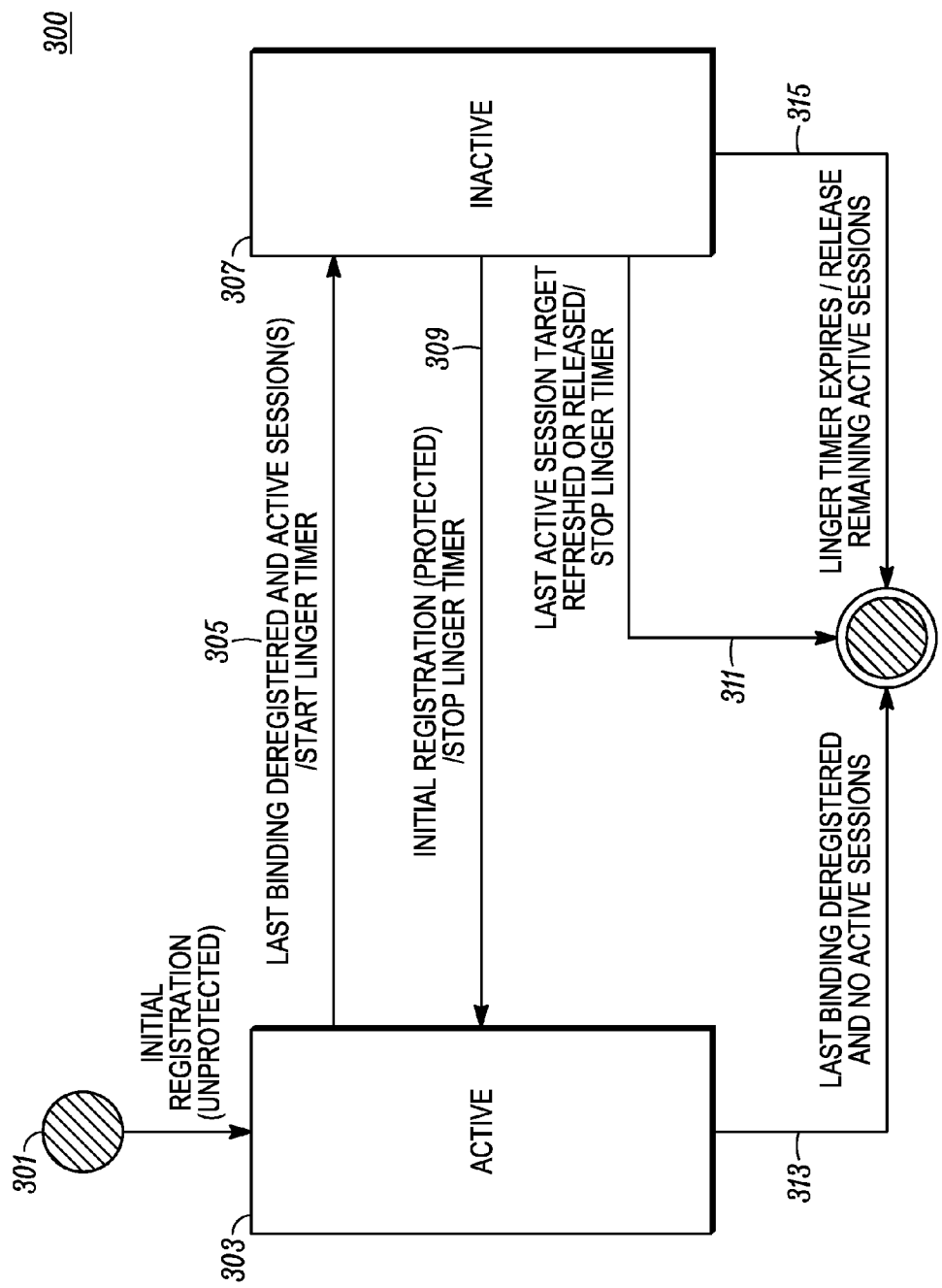
FIG. 3 is a state machine diagram illustrating management of inactive IMS connections in accordance with some embodiments.

Turning now to FIG. 3, a state machine diagram is provided for illustrating management of inactive IMS connections. Thus, in FIG. 3, a mobile station may initially register via unprotected registration 301 which will be described in further detail below. An active IMS connection 303 is then established. A mobile station in accordance with the embodiments may send a re-registration message such that bindings are deregistered as shown in 305. After the last binding is deregistered, one or more active sessions may still exist, in which case the Linger Timer is invoked 305 and the IMS connection becomes inactive 307. The mobile station may, at any subsequent time before expiration of the Linger Timer, or otherwise before the inactive IMS connection is terminated, re-register the IMS connection 309, which stops the Linger Timer and returns the IMS connection to the active state 303.

Otherwise, the Linger Timer may be stopped when the last active session is target refreshed, that is, moved to a different IMS connection, or released 311 by the mobile station. If the Linger Timer times out 315, any active sessions will be released without the explicit action of the mobile station. Returning briefly to active state 303, if all bindings are deregistered and no active sessions are present, the IMS connection may be terminated immediately as in 313, without invoking the Linger Timer. Thus, 313 differs from 305 in that, for 305 active sessions remain and thus the Linger Timer is invoked to provide the mobile station with an opportunity to take action regarding the sessions, such as releasing or refreshing on a different but active IMS connection.

In addition to embodiments incorporating the Linger Timer for management of active sessions, in some embodiments either a P-CSCF or a S-CSCF may also keep track of the UE 200 SIP subscriptions to event packages such that an inactive IMS connection may maintain subscriptions even if the IMS connection does not have active sessions when its last registration binding is removed.

Further details regarding the various re-registration procedures that may be employed for seamless IMS connections in the various embodiments are now provided. The high-level operative model of the embodiments may invoke four re-registration procedures for management of a UE's IMS connections. These re-registration procedures consist of the following: 1) an unprotected Global Seamless IMS re-registration procedure, 2) a protected Global Seamless IMS re-registration procedure, 3) an unprotected Seamless IMS (re-)registration procedure, and 4) a protected Seamless IMS (re-)registration procedure.

In the various embodiments, the unprotected Global Seamless IMS re-registration procedure is a procedure wherein all registration bindings may be moved for a specific Private User ID to a new IMS connection without causing the loss of on-going IMS dialogs. Further in the various embodiments, the global nature of the disclosed methods minimize the amount of signaling exchange, and consequently the latency, required to perform handovers associated with seamless device mobility, for example, when a UE moves across various IP-CAN coverage areas as was discussed above with respect to FIG. 1.

Thus, in the various embodiments an IMS subscriber may use an unprotected initial IMS registration procedure with two additional extensions as disclosed and described herein. The first extension in accordance with the embodiments is a "seamless-ims" parameter which is included in both the "Require" header and the "Proxy-Require" header. The seamless-ims parameter enables an IMS UE to signal to the IMS network a request for the Seamless IMS connections procedure of the various embodiments, as part of the IMS registration procedure.

Further, the various embodiments provide a "imsglobreg" parameter in the To header. The imsglobreg parameter enables an IMS UE to signal to the IMS network that it should move all registration bindings for the subscriber's Private User ID to the new contact address.

Figure 4:
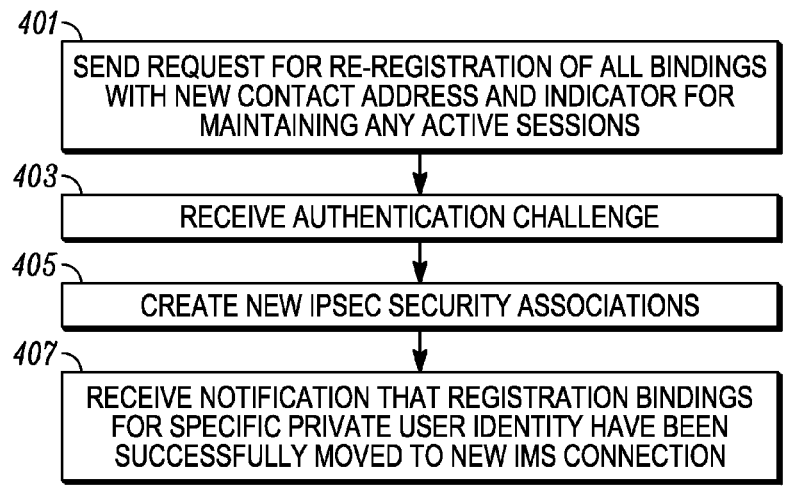
FIG. 4 is a flow chart illustrating high level operation of a mobile station during an unprotected global seamless IMS re-registration in accordance with an embodiment.
Figure 5:
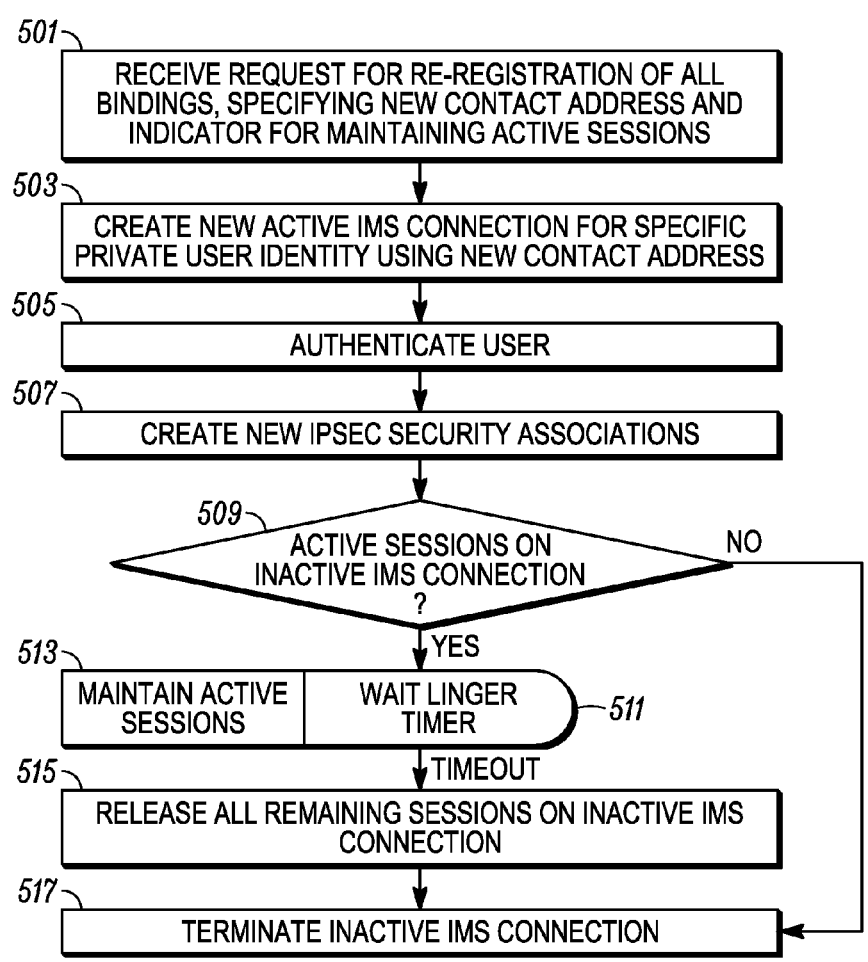
FIG. 5 is a flow chart illustrating high level operation of an IMS Core Network (CN) during an unprotected global seamless IMS re-registration in accordance with an embodiment corresponding to the mobile station embodiment illustrated by FIG. 4.

FIG. 4 illustrates high level operation of a UE invoking unprotected global seamless IMS re-registration in accordance with an embodiment, and FIG. 5 illustrates the corresponding high level operation of the IMS network or IMS Core Network (CN). In the various embodiments, the IMS subscriber may use any one of its currently registered Public User IDs to invoke the unprotected Global Seamless IMS re-registration procedure. Thus in 401, the UE sends a request for re-registration of all bindings and provides a new contact address. In processing the unprotected initial IMS registration request, which is received as shown in 501, the IMS Core Network (CN) will recognize the "imsglobreg" parameter and will associate it with a request for the Global Seamless IMS re-registration procedure.

The IMS CN will thus utilize the Private User ID received in the username field of the "Authorization" header to determine the full set of IMS connections that need to be re-registered to the new contact address supplied in the "Contact" header.

The IMS CN will process the unprotected initial IMS registration request by recognizing the "seamless-ims" parameter and interpreting the request as invoking the Seamless IMS Connections procedure. In accordance with the various embodiments, the Seamless IMS Connections procedure will be specified in the IMS CN to keep alive existing dialogs and provide the IMS subscriber with sufficient time to move its dialogs to the newly registered IMS connection. Thus as shown in 503, a new active IMS connection will be created by the IMS CN.

It is to be noted that the registration procedures of the embodiments are unlike existing unprotected initial IMS registration procedures, which would first deregister the Public User ID, and all Public User IDs in its implicit registration set, and release all sessions associated with that Public User ID, and all Public User IDs in its implicit registration set, before re-registering the Public User ID.

In the various embodiments, the IMS CN will perform IMS re-authentication of the subscriber's Private User ID, as in 505, in accordance with standard authentication procedures, for example as specified within the $3^{rd}$ Generation Partnership Project (3GPP) Technical Standards, 3GPP TS 24.229, *Technical Specification Group Core Network and Terminals, IP Multimedia Call Control Protocol Based On SIP and SDP* v7.4.0 (June 2006).

Thus, in 403 the mobile station will receive an authentication challenge, such as an AKA challenge in some embodiments. Upon successful IMS re-authentication in 505, the IMS CN will update all the registration bindings, currently associated with the specified Private User ID, with the new contact address. The registration bindings update includes all Public User ID bindings as well as all Globally Routable User Agent URIs (GRUU) bindings. In addition, a new set of IPSec SAs based on the new contact address is created between the IMS UE and the P-CSCF and the IMS UE as shown in 405 and 507, respectively.

Returning briefly to FIG. 4, the UE will create the new IPsec security associations in 405 and will receive notification of the new active IMS connection as shown in 407, for example, via a SIP "200 OK" message. Therefore, subsequent to receiving the notification in 407 the UE may proceed to move any active sessions from the old IMS connection to the newly established IMS connection.

As was discussed with respect to FIG. 3, some embodiments will include management of inactive connections, that is, provisioning of time such that the UE may move any remaining active sessions to the new IMS connection. FIG. 5, illustrates this high level operation starting in 509, wherein if no active sessions remain on the previous and now inactive IMS connection, the inactive IMS connection may be immediately terminated as shown in 517. However, if active sessions remain, the Linger Time 511, as was discussed will in initialized and the active sessions will be maintained for the Linger Timer 511 period as shown in 513. The Linger Time period is predetermined by the CN, more specifically the S-CSCF, and will typically be on the order of several minutes.

After timeout, all remaining sessions on the inactive connection are released as shown in 515 and the inactive connection is terminated in 517.

Figure 6:
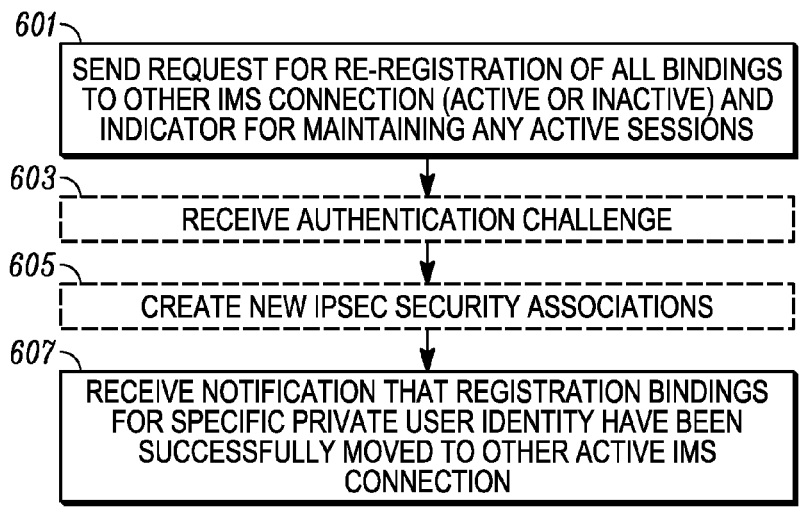
FIG. 6 is a flow chart illustrating high level operation of a mobile station during a protected global seamless IMS re-registration in accordance with an embodiment.
Figure 7:
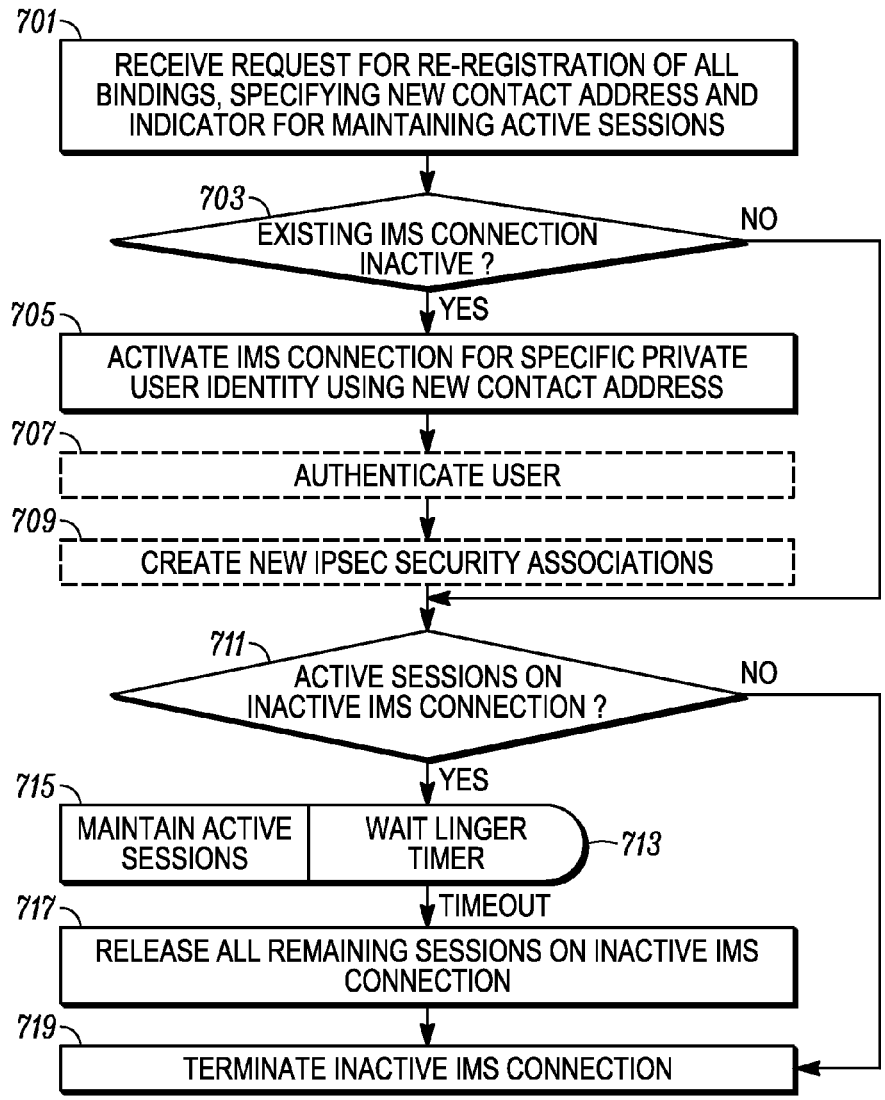
FIG. 7 is a flow chart illustrating high level operation of an IMS Core Network (CN) during a protected global seamless IMS re-registration in accordance with an embodiment corresponding to the mobile station embodiment illustrated by FIG. 6.

FIG. 6 and FIG. 7 are flow charts illustrating high level operation of a mobile station and IMS CN respectively, for a protected global seamless IMS re-registration in accordance with an embodiment. In 601 the UE sends a request for re-registration of all bindings to another existing IMS connection, which may be an active connection or an inactive connection. In 603 the UE may receive an authentication challenge, such as an AKA challenge in some embodiments, and may create new IPsec security associations in 605. In 607, the UE receives notification from the CN, which may be a SIP "200 OK" message. Therefore, subsequent to receiving notification in 607 the UE may proceed to move any active sessions corresponding to the re-registered bindings from the old IMS connection to the other active IMS connection.

Correspondingly in FIG. 7, 701, the CN receives the request. In 703, the CN determines whether the existing connection is inactive and, if so, activates the connection in 705. It may be necessary to authenticate, or more accurately "reauthenticate" the user in 707 and create a new set of IPsec SAs as shown in 709 wherein the new set of IPsec SAs replace the previous set. However, typically for an existing connection, IPSec SAs have already been established, and therefore it is not necessary to perform Private User ID re-authentication and establish new IPSec SAs. Thus the CN may in general, activate the connection in 705 if inactive and, if active sessions are determined present on the previous connection, now inactive, as in 711, the Linger Timer will be set in 713 and the active sessions will be maintained 715 for the Linger Timer 713 time period. After timeout, the CN or S-CSCF will release all the sessions and will initiate a network initiated de-registration procedure of all the bindings which will cause the P-CSCF to delete the previous set of IPsec SAs.

As illustrated in FIG. 2, IMS connections may be established via the same P-CSCF or via a different P-CSCF. However, whether the new IMS connection uses the same P-CSCF or a different P-CSCF as the old IMS connection, the S-CSCF of the various embodiments will allow the IMS UE to maintain use of the old, inactive IMS connection to move its sessions and subscriptions over to the new IMS connection and to complete stand-alone transactions.

In FIG. 5 and FIG. 7, if the new or existing IMS connection uses the same P-CSCF as the old IMS connection, then the old subscription to the registration event package is maintained and the IMS subscriber does not have to send a new SUBSCRIBE request, assuming the use of Globally Routable User Agent Uniform Resource Identifiers (GRUU), otherwise a target refresh operation would be required. Upon successful completion of the unprotected Global Seamless IMS re-registration procedure, the IMS subscriber will receive a registration event package notification, over the new IMS connection, indicating all the updated registration bindings.

If the new IMS connection uses a different P-CSCF than the old IMS connection, then upon successful completion of the unprotected Global Seamless IMS re-registration procedure, the IMS subscriber will initiate a new subscription to the registration event package by sending a SUBSCRIBE with "replaces" request to the S-CSCF. The IMS UE will then receive a registration event package notification, over the new IMS connection, indicating all of its registration bindings. The S-CSCF will then delete the old subscription. Session dialog handling will be discussed further below with respect to FIG. 12.

Figure 8:
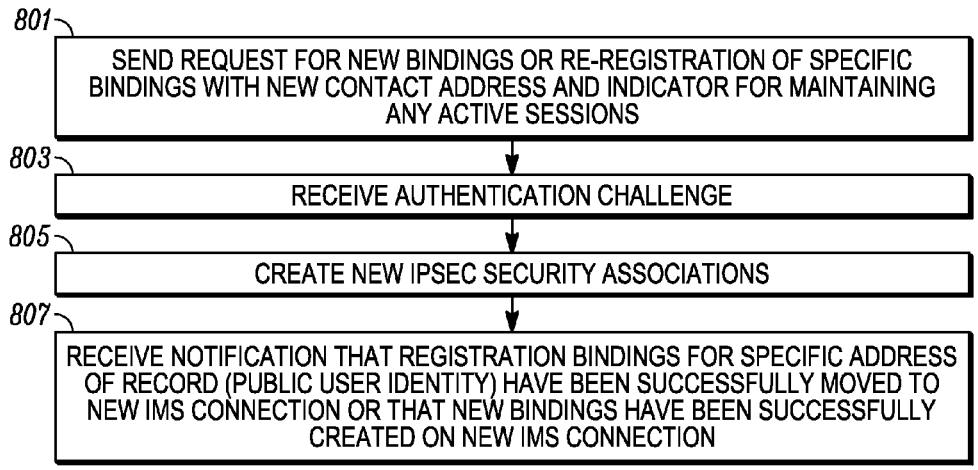
FIG. 8 is a flow chart illustrating high level operation of a mobile station during an unprotected seamless IMS re-registration in accordance with an embodiment.
Figure 9:
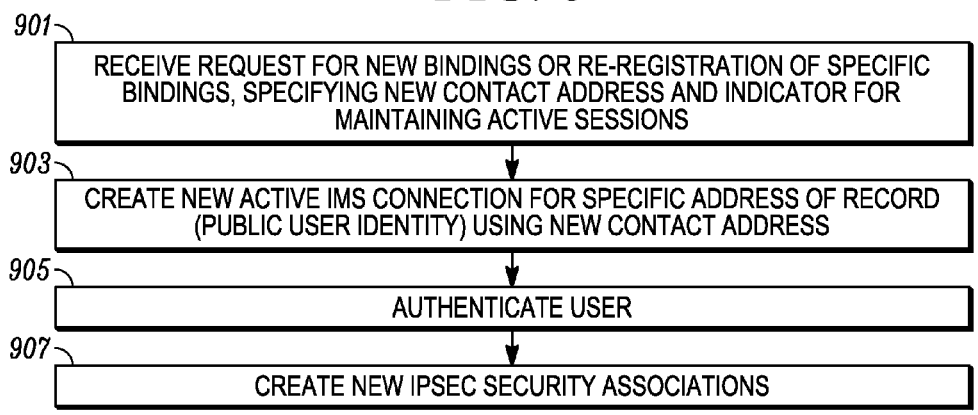
FIG. 9 is a flow chart illustrating high level operation of an IMS Core Network (CN) during an unprotected seamless IMS re-registration in accordance with an embodiment corresponding to the mobile station embodiment illustrated by FIG. 8.

FIG. 8 and FIG. 9 illustrate unprotected seamless IMS registration or re-registration in accordance with some embodiments. This procedure may be used either to register new bindings for a Public User ID to a new IMS connection or re-register a specific binding or specific bindings for a Public User ID from an existing active IMS connection to a new IMS connection. A single IMS UE may manage multiple IMS connections in accordance with embodiments employing the procedure.

To invoke this procedure, an IMS UE will use an unprotected initial IMS registration procedure having an extension in accordance with the embodiments. Thus in 801 a "seamless-ims" parameter is included in both the Require header and the Proxy-Require header of a SIP message to request new bindings or re-registration of bindings. The seamless-ims parameter is an indicator to the IMS CN, handled by the S-CSCF, to signal that the UE wishes to invoke the Seamless IMS Connections procedures of the embodiments as part of the IMS registration procedure. Therefore, in accordance with the embodiments, the IMS CN will recognize the "seamless-ims" parameter and will interpret the request as invoking the Seamless IMS Connections procedure. The Seamless IMS Connections procedure of the embodiments will be specified in the IMS CN and will keep alive existing dialogs and provide the IMS UE with sufficient time to move appropriate dialogs to the newly registered IMS connection in the event that an active IMS connection becomes inactive.

The IMS UE may also re-register specific bindings for a Public User ID to either a new or active IMS connection as well as register new bindings for a Public User ID to either a new or active IMS connection. Whenever movement of bindings results in an inactive IMS connection, and particularly when active sessions remain, the inactive IMS connection may be managed using the Linger Timer procedures as were discussed previously with respect to FIG. 3.

In an alternative embodiment, the bindings for a Public User ID are allowed to be registered over both the old and new IMS connections, which is more compliant with the SIP registration procedures, for example registration procedures discussed in Rosenberg, et al., *SIP: Session Initiation Protocol*, IETF RFC 3261 (June 2002) [hereinafter "RFC 3261"]. In this case, the IMS UE is responsible for deregistering the old bindings at an appropriate time. For example, a "SIP REGISTER" request in accordance with RFC 3261 also allows registration bindings to be moved from the old to the new IMS connection in the same REGISTER command.

Returning to FIG. 8, in 803, the UE will receive an authentication challenge, such as an AKA challenge in some embodiments, and creates a new set of IPsec SAs in 805. In 807, the UE receives notification of the new IMS connection and subsequent to 807 may proceed to move active sessions from the old IMS connection to the new IMS connection. In FIG. 9, the IMS CN, or S-CSCF action is illustrated. Thus in 901, the CN or S-CSCF receives the request having the seamless-ims parameter and in 903 proceeds to create a new active IMS connection. In 905, the IMS CN performs IMS re-authentication of the subscriber's Private User ID, and upon successful re-authentication, updates the registration bindings associated with the specified Private User ID. In 907, a new set of IPSec SAs based on the new contact address is created between the P-CSCF and the IMS UE.

Figure 10:
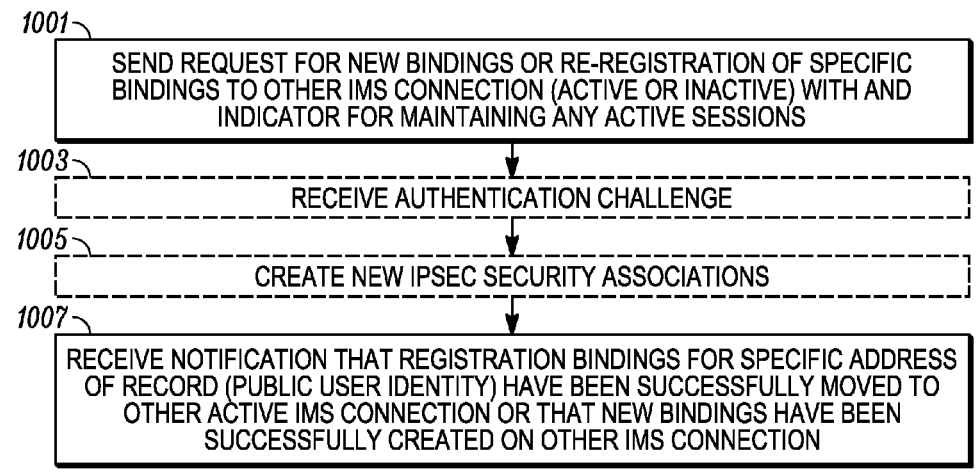
FIG. 10 is a flow chart illustrating high level operation of a mobile station during a protected seamless IMS re-registration in accordance with an embodiment.
Figure 11:
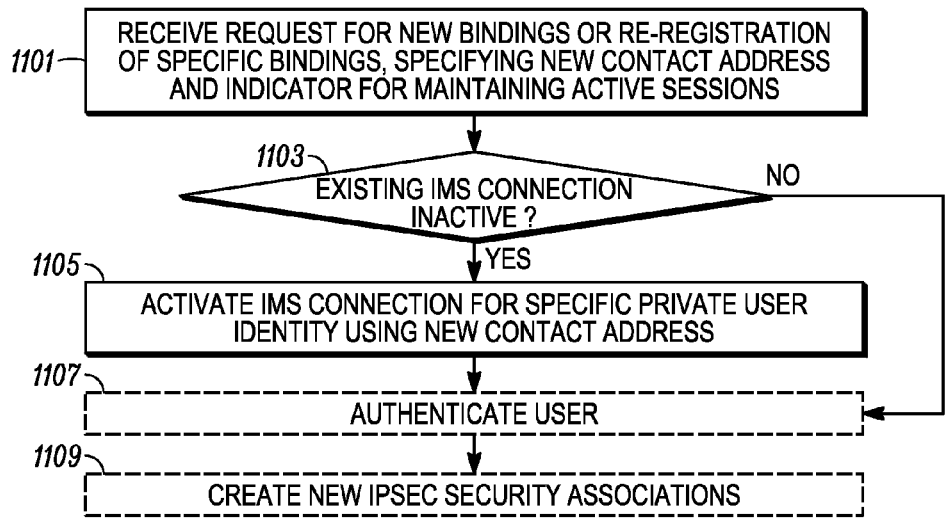
FIG. 11 is a flow chart illustrating high level operation of an IMS Core Network (CN) during a protected seamless IMS re-registration in accordance with an embodiment corresponding to the mobile station embodiment illustrated by FIG. 10.

FIG. 10 and FIG. 11 illustrate high level operation of a UE and S-CSCF or CN for protected Seamless IMS registration or re-registration in accordance with some embodiments. This procedure may be used either to register new bindings for a Public User ID to an existing active IMS connection or re-register one or more specific bindings for a Public User ID from one active IMS connection to another active IMS connection. The procedure is similar to the unprotected Seamless IMS registration discussed above, the difference being that IPSec SAs for the new IMS connection have already been established. Thus, Private User ID re-authentication and establishment of new IPSec SAs is not necessary. Thus the registration bindings may be moved or added to an existing active IMS connection rather than to a new active IMS connection, as defined by the protected Seamless IMS registration procedure discussed above with respect to FIG. 8 and FIG. 9.

Thus in 1001, a request is sent by the UE for new bindings or to re-register one or more specific bindings to another IMS connection. In 1003, the UE may receive an authentication challenge and may create new IPsec security associations in 1005 when re-authentication is necessary as was discussed above.

In 1007 the UE receives notification of registration of the requested one or more bindings. Therefore, subsequent to 1007, the UE may proceed to move sessions to the other connection. FIG. 11 illustrates the CN or S-CSCF action wherein in 1101 the S-CSCF receives the request, and in 1103 if the other connection is inactive, it is activated in 1105. Note that authentication 1107 and new IPsec SAs 1109 are typically not needed for an existing connection as was discussed above. It is also to be noted that the Linger Timer procedures as were discussed previously with respect to FIG. 3 may be applied whenever an inactive IMS connection is created.

Figure 12:
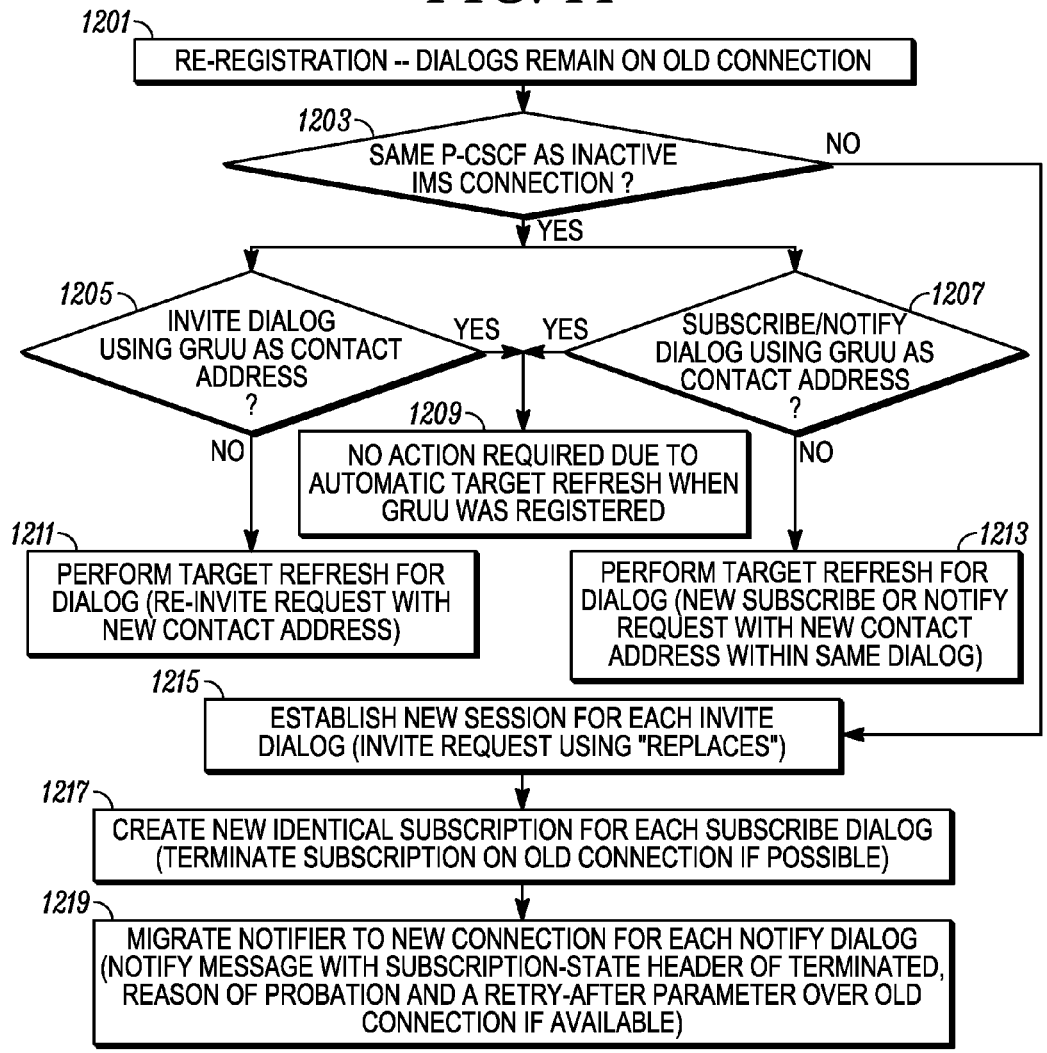
FIG. 12 is a flow chart illustrating how session dialogs are handled depending upon whether a new active IMS connection is via the same or a different P-CSCF in accordance with various embodiments.

FIG. 12 is a flow chart illustrates how session dialogs are handled depending upon whether a new active IMS connection is via the same or a different P-CSCF in accordance with various embodiments. Thus FIG. 12 begins by assuming that a first old connection and a new, or otherwise second connection exists. Also assumed is that the first connection has dialogs remaining.

In 1203, the issue of whether the P-CSCF is different is addressed. If the P-CSCF is the same, and if dialogs are using GRUU contacts addresses, then in general no action is required as shown in 1209. This is because the dialogs will be automatically target refreshed when the GRUU is registered on the new connection. Therefore, it is preferable in the various embodiments to utilize GRUUs.

For INVITE dialogs not using GRUUs in 1205, a target refresh will be performed by, for example, sending a re-INVITE request with the new contact address as shown in 1211.

For SUBSCRIBE/NOTIFY dialogs not using GRUUs in 1207 a target refresh will be performed by, for example a new SUBSCRIBE or NOTIFY request with a new contact address within the appropriate dialog.

If the P-CSCF is different then for INVITE dialogs, a new session for each INVITE dialog will be established in 1215 by sending an INVITE using "replaces." In 1217, new identical subscriptions are created for each SUBSCRIBE dialog and, if possible, the identical subscriptions of the old connection will be terminated. In 1219, for each NOTIFY dialog, the notifier will be migrated to the new connection by, for example, a NOTIFY message with the subscription-state header of "terminated," with a reason indication of "probation" and also a "retry-after" indication.

Another consideration of the various embodiments is that, when an IMS session is moved to a different IMS connection than the one it was established on, session updates may be required if IP connectivity for the session media bearer or bearers, provided by the IP-CAN, is/are no longer available and a new media connection address must be re-negotiated. One scenario where this may occur is when handing over between IP-CANs. However, where IP connectivity is not impacted by the IMS connection change the UE may maintain existing media bearers for the session duration thereby minimizing media quality interruption. Further, reestablishment of media bearers, for example of a new IP-CAN may require a session downgrade, such as dropping media flows or changing codecs, if the new IP-CAN has insufficient bandwidth to support the original session. However, in some scenarios, additional bandwidth may become available in which case the UE may upgrade a session, for example by adding new media flows or changing codecs. In general, the media bearer of an IMS session may be managed independently of the IMS connection however in some cases the events impacting the IMS connection may also impact the media bearer.

Figure 13:
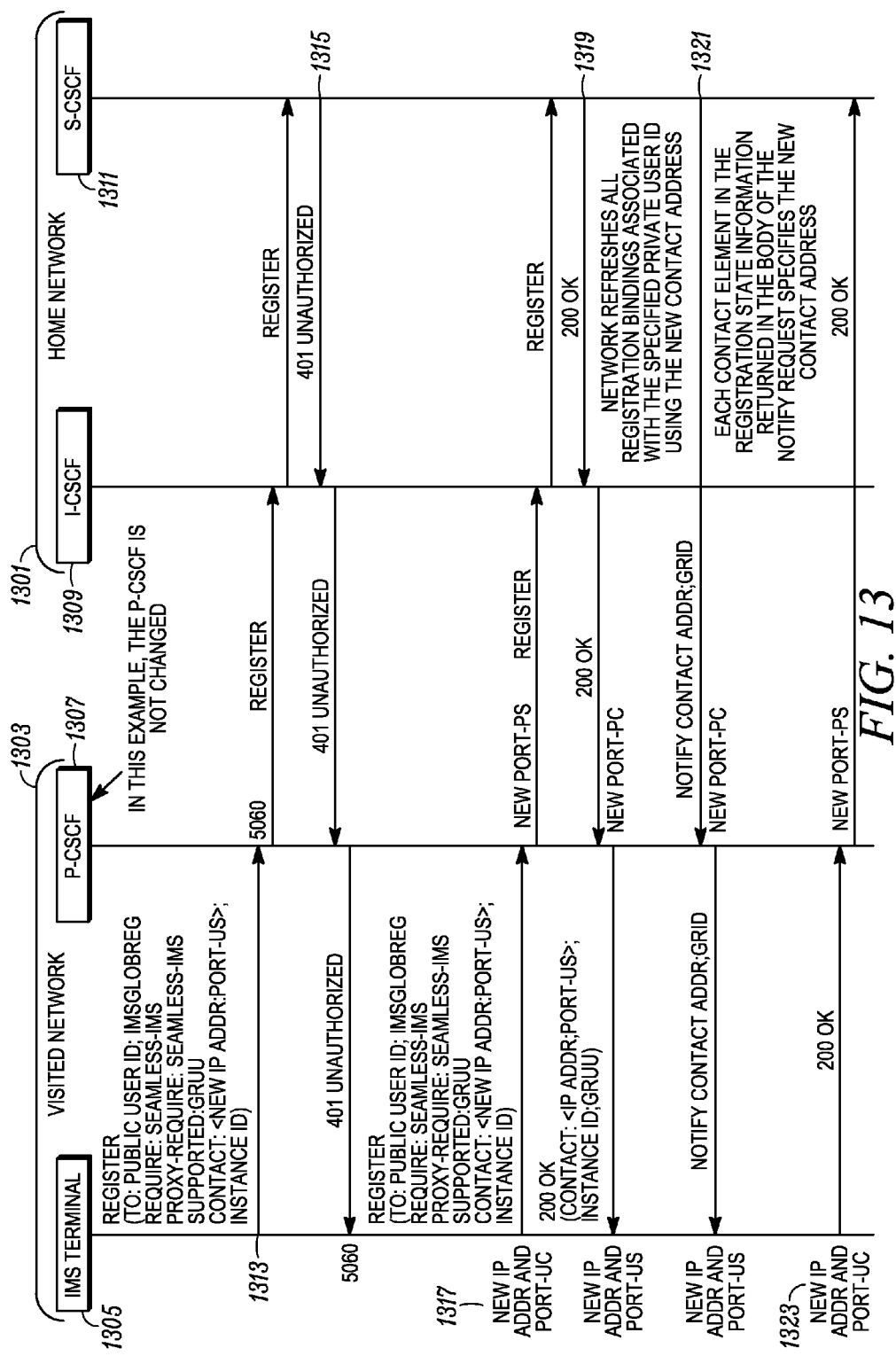
FIG. 13 is a SIP message flow diagram illustrating exemplary SIP messages for the unprotected global seamless IMS registration illustrated in FIG. 4 and FIG. 5, in accordance with an embodiment.

The various embodiments employ SIP messaging between the UE and CN or S-CSCF and any intermediate P-CSCF as was discussed above. FIG. 13 provides an exemplary SIP signaling from for the unprotected global seamless IMS registration illustrated by FIG. 4 and FIG. 5.

The example of FIG. 13 assumes that the IMS UE 1305 has an active IMS connection as a result of a previous IMS registration. Because the IMS UE 1305 wishes to register a new contact IP address for all of its registered Public User IDs and GRUUs, it initiates a Global Seamless IMS re-registration procedure. The example of FIG. 13 also assumes that the new IMS connection uses the same P-CSCF as the old IMS connection.

FIG. 13 illustrates exemplary SIP messaging between the IMS UE or IMS Terminal 1305 and a P-CSCF 1307 when the UE 1305 is in a visited IP-CAN, that is, visited network 1303. The S-CSCF 1311 resides within the UE 1305 home network 1301 in this example. Also present in the home network 1301, is an Interrogating-Call Session Control Function (I-CSCF) 1309 which may perform a stateless SIP proxy function and may select the appropriate S-CSCF, in this example, S-CSCF 1311, as was discussed generally, previously with respect to FIG. 1.

Returning to FIG. 13, the IMS terminal 1305 invokes the unprotected global seamless re-registration of the embodiments via an unprotected initial IMS registration procedure. As part of the initial registration, the IMS terminal 1305 includes the "seamless-ims" parameter in the Require and Proxy-Require headers of the REGISTER request 1313. If "seamless-ims" were not specified by the IMS terminal 1305, then the REGISTER request would be treated as a normal initial IMS registration procedure and would not benefit from the capabilities provided by the various embodiments.

The REGISTER request 1313 is sent to P-CSCF 1307 which is subsequently passed on to the I-CSCF 1309 and thus the S-CSCF 1311 as shown. Therefore, handling of the messaging is at the IMS Terminal 1305 and S-CSCF 1311 endpoints, which signaling passing through the proxies P-CSCF 1307 and I-CSCF 1309.

The "To" header of the REGISTER request 1313 must contain one of the IMS subscriber's registered public user IDs as well as the "imsglobreg" parameter. The "Contact" header of the REGISTER request 1313 also contains the new contact address being registered.

The "Contact" header may also contain a "+sip.instance" parameter specifying an Instance ID which would indicate support for the "gruu" extension is indicated in the "Supported" header of the REGISTER request. Further with respect to the Instance ID, the "Contact" header in a "200 OK" response to a second, that is, authenticated, REGISTER request will contain the GRUUs that were generated for each Public User ID/Instance ID pair.

It is to be noted however that the instance ID in this example has no significant impact on the proper execution of the procedure in accordance with the embodiments other than it is a currently registered instance of the Public User ID specified in the "To" header. Thus, a "Contact" header without a "+sip.instance" parameter is still in accordance with the embodiments. However, if the IMS UE has registered GRUUs that will be moved as a result of the procedure herein disclosed, then the "Supported" header must indicate support for the "gruu" extension to remain in accordance with the embodiments.

Returning to FIG. 13, the S-CSCF responds the REGISTER request 1313 with a "401 unauthorized" message 1315. The second REGISTER request 1317 is then sent by IMS terminal 1305 having the imsglobreg and seamless-ims parameters, as well as a new contact address. The S-CSCF 1311 responds with "200 OK" message 1319 and the IMS CN refreshes all registration binding associated with the specified Private User ID using the new contact address. A NOTIFY message 1321 is sent to the IMS Terminal 1305 from the S-CSCF 1311 and the IMS Terminal 1305 may respond with a "200 OK" message 1323. The registration information returned in the NOTIFY message 1321 includes the new contact address for all registered Public User IDs and Public User ID/Instance ID pairs associated with the Private User ID authenticated by this registration.

FIGS. 14 through 18 provide detailed examples of the SIP messages illustrated by FIG. 13. FIG. 14 provides details of an initial SIP REGISTER message 1400. The "To" header 1401 contains the "imsglobreg" parameter and the "Require" and "Proxy-Require" header contain the "seamless-ims" parameter as was previously discussed. In addition, the new IP address being registered, that is, the new contact address, is shown in the Contact header 1407. FIG. 15 provides details of a SIP 401 Unauthorized message 1500 that is returned unprotected to the IMS UE. The "To" header contains the imsgloreg parameter and the message 1500 also contains an IMS-AKA challenge.

FIG. 16 provided details of the second SIP REGISTER request 1600 sent by the IMS Terminal to the P-CSCF, and ultimately the S-CSCF. The message 1600 contains an authentication response and is sent protected via the newly created IPSec SA to the P-CSCF's server port. The "To" header contains the imsglobreg parameter and the "Require" and "Proxy-Require" headers include a seamless-ims parameter. FIG. 17 provided details of a SIP 200 OK response 1700, that is returned to the IMS Terminal upon successful Global Seamless IMS re-registration. The message 1700 is sent protected via the newly created IPSec SA to the IMS Terminal's server port.

FIG. 18 provides details of the NOTIFY Request 1800, triggered by the Global Seamless IMS re-registration procedure. The SIP NOTIFY request 1800 is sent by the P-CSCF, ultimately sent by the S-CSCF, to the IMS Terminal upon successful completion of the Global Seamless IMS re-registration procedure. The message 1800 is sent protected via the new IPSec SA to the IMS Terminal's server port.

The new contact address IP is returned in all the contact elements and the GRUUs and Instance IDs are returned in the contact elements for the registered Public User ID/Instance ID pairs, such as 1801, 1803, 1805 and 1807. Note that in the example of FIG. 18, both explicitly registered AORs (e.g., "sip:user1_public1@home1.net", "tel:+1-212-555-1111", "sip:user2_public2@home1.net", "sip:user3_public3@home1.net") and implicitly registered AORs (e.g., "tel:+1-212-555-3333") have been re-registered. It is to be noted that the GRUUs have not been changed as a result of the procedure as they remain persistent during successful re-registration events.

Figure 19:
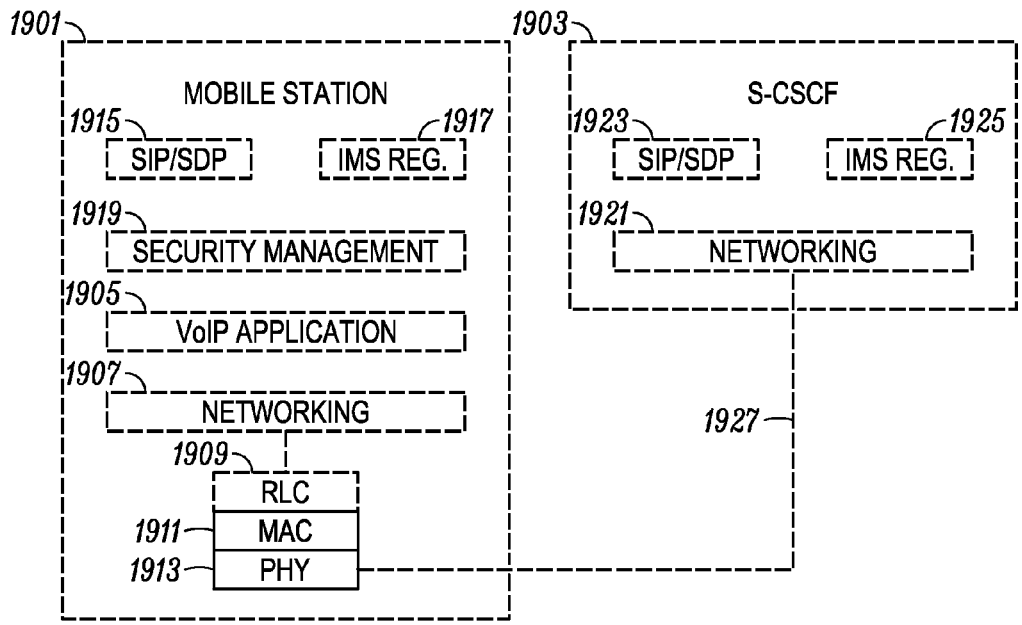
FIG. 19 is a high level architecture diagram of a mobile station and a S-CSCF, both having an IMS Registration module in accordance with various embodiments.

Turning now to FIG. 19, a mobile station 1901 and a S-CSCF 1903 architectures in accordance with the various embodiments are illustrated. Mobile station 1901 comprises a stack having a VoIP application 1905, a networking layer 1907, a Radio Link Controller (RLC) 1909, a Medium Access Controller (MAC) 1911, and a Physical Layer (PHY) 1913. In addition, mobile station 1901 has a Session Initial Protocol/Session Description Protocol (SIP/SDP) component 1915, which may be separate or may be integrated into any of the other components/layers. As described in detail above, the mobile station SIP/SDP component 1915 sends and receives the various SIP messages associated with the registration and/or re-registration procedures described above in accordance with the various embodiments. The mobile station 1901 IMS Registration module 1917 which may be integrated into the SIP/SDP module 1915, enables the mobile station 1901 to invoke the registration and/or re-registration procedures of the various embodiments. The mobile station may transmit SIP and SDP messages to a base station on the physical layer, which are transported ultimately to the S-CSCF 1903 such that the mobile station 1901 and S-CSCF 1903 communicate via a networking path 1927. The mobile station 1901 also has a security management module 1919, which may be a separate module, or integrated into some other module such as IMS Registration module 1917 or SIP/SDP module 1915. The security management module 1919 provides authentication functions and management of IPsec connections between the mobile station 1901 and various P-CSCFs.

The S-CSCF 1903 may similarly have a networking layer 1921. The corresponding RLC, MAC and PHY, VoIP and other applications, are typically found within a base station and/or network controller of an IP-CAN. The S-CSCF 1903 however will have a SIP/SDP module 1923 which may provide session control and routing. As described in detail above, the S-CSCF 1903 IMS Registration module 1925 provides the various capabilities of the various embodiments described above such as the various registration and/or re-registration procedures described above and also the Linger Timer function for management of inactive IMS connections resulting from any of the herein described procedures.

Figure 20:
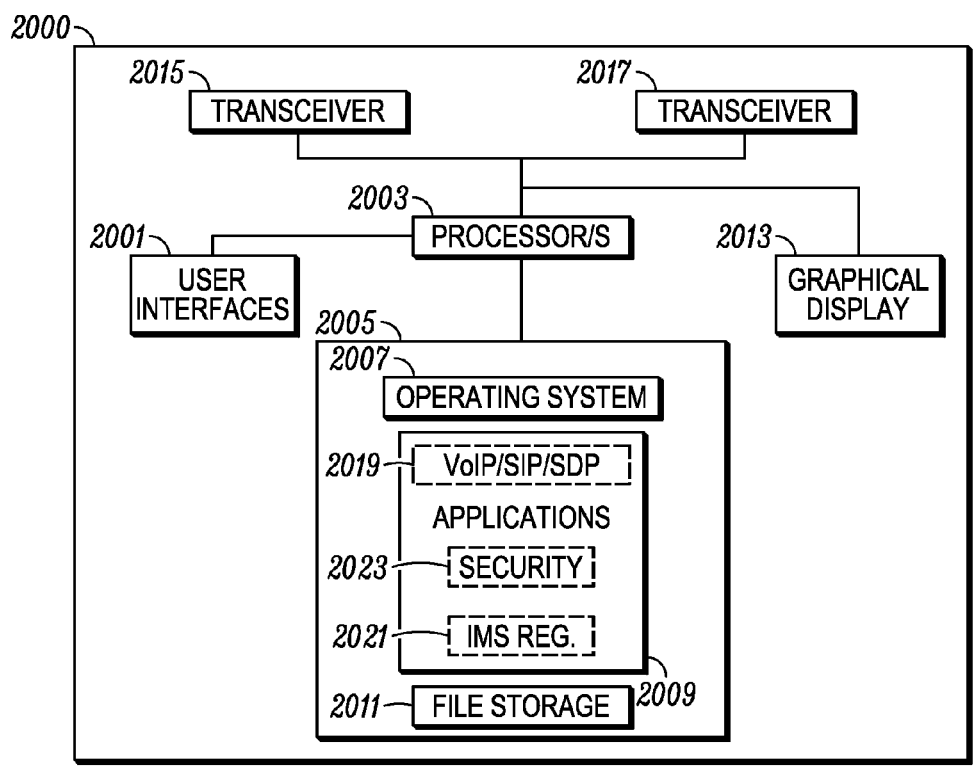
FIG. 20 is a block diagram of a mobile station having an IMS Registration module in accordance with an embodiment.

FIG. 20 is a block diagram illustrating the primary components of a mobile station in accordance with some embodiments. Mobile station 2000 comprises user interfaces 2001, at least one processor 2003, and at least one memory 2005. Memory 2005 has storage sufficient for the mobile station operating system 2007, applications 2009 and general file storage 2011. Mobile station 2000 user interfaces 2001, may be a combination of user interfaces including but not limited to a keypad, touch screen, voice activated command input, and gyroscopic cursor controls. Mobile station 2000 has a graphical display 2013, which may also have a dedicated processor and/or memory, drivers etc. which are not shown in FIG. 20.

It is to be understood that FIG. 20 is for illustrative purposes only and is for illustrating the main components of a mobile station in accordance with the present disclosure, and is not intended to be a complete schematic diagram of the various components and connections therebetween required for a mobile station. Therefore, a mobile station may comprise various other components not shown in FIG. 20 and still be within the scope of the present disclosure.

Returning to FIG. 20, the mobile station 2000 may also comprise a number of transceivers such as transceivers 2015 and 2017. Transceivers 2015 and 2017 may be for communicating with various IP-CANs using various standards such as, but not limited to, UMTS, E-UMTS, E-HRPD, CDMA2000, 802.11, 802.16, etc.

Memory 2005 is for illustrative purposes only and may be configured in a variety of ways and still remain within the scope of the present disclosure. For example, memory 2005 may be comprised of several elements each coupled to the processor 2003. Further, separate processors and memory elements may be dedicated to specific tasks such as rendering graphical images upon a graphical display. In any case, the memory 2005 will have at least the functions of providing storage for an operating system 2007, applications 2009 and general file storage 2011 for mobile station 2000. In some embodiments, and as shown in FIG. 20, applications 2009 may comprise a software stack that communicates with a stack in the S-CSCF, as well as various stacks in the IP-CANs such as, but not limited to, VoIP/SIP/SDP modules 2019. Therefore, applications 2009 may also comprise an IMS registration module 2021 for invoking the registration and/or re-registration procedures of the various embodiments as were described in detail above. Applications 2009 may also comprise Security Management module 2023, for authentication and management of IPsec connections between various P-CSCFs.

While the preferred embodiments have been illustrated and described, it is to be understood that the invention is not so limited. Numerous modifications, changes, variations, substitutions and equivalents will occur to those skilled in the art without departing from the spirit and scope of the present invention as defined by the appended claims.

What is claimed is:

1. A method in a network entity, the method comprising:
establishing, with a mobile station, a new connection, wherein said mobile station has an existing connection having an existing registration binding and an existing active session;
receiving a request from said mobile station to move said existing registration binding from said existing connection to said new connection;
moving said existing registration binding from said existing connection to said new connection in response to said request;
determining that said existing connection is in an active state if any other registration binding remains associated with said existing connection and determining that said existing connection is in an inactive state if said existing registration binding was the only registration binding associated with said existing connection;
determining whether any active sessions remain associated with said existing connection if said existing connection is in an inactive state;
setting a timer for said existing connection if any active sessions remain;
maintaining said existing connection in said inactive state for duration of said timer; and
terminating said existing connection if no active sessions remain or if said timer expires.

2. The method of claim 1, further comprising:
releasing any active sessions for said existing connection if said timer expires.

3. The method of claim 1, further comprising:
sending a message to said mobile station indicating said duration of said timer for said existing connection.

4. The method of claim 1, further comprising:
receiving a registration request from said mobile station, to register a contact address on said existing connection, when said existing connection is in an inactive state, said contact address having been previously registered on said existing connection; and
stopping said timer in response thereto.

5. The method of claim 4, further comprising:
reregistering said contact address on said exiting connection in response to said registration request; and
determining that said existing connection is in an active state.

* * * * *